(12) United States Patent
Hosoe

(10) Patent No.: US 8,817,161 B2
(45) Date of Patent: Aug. 26, 2014

(54) IMAGING APPARATUS FOR PERFORMING AUTOMATIC ZOOM CONTROL IN CONSIDERATION OF FACE INCLINATION OF A SUBJECT IMAGE

(75) Inventor: Hiroshi Hosoe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/274,601

(22) Filed: Oct. 17, 2011

(65) Prior Publication Data

US 2012/0098992 A1 Apr. 26, 2012

(30) Foreign Application Priority Data

Oct. 26, 2010 (JP) .................................. 2010-239489

(51) Int. Cl.
*H04N 5/222* (2006.01)
(52) U.S. Cl.
USPC .................................. 348/333.11; 348/333.02
(58) Field of Classification Search
USPC .................................. 348/222.1, 239, 207.99, 348/333.02–333.04; 382/118, 117
See application file for complete search history.

(56) References Cited

U.S. PATENT DOCUMENTS

| 7,432,973 | B2 * | 10/2008 | Iga | 348/333.03 |
| 2008/0199056 | A1 * | 8/2008 | Tokuse | 382/118 |
| 2008/0239104 | A1 * | 10/2008 | Koh | 348/240.99 |
| 2010/0195912 | A1 * | 8/2010 | Nakada et al. | 382/190 |
| 2011/0007191 | A1 * | 1/2011 | Song et al. | 348/240.99 |

FOREIGN PATENT DOCUMENTS

| CN | 101241549 A | 8/2008 |
| JP | 2005-130468 A | 5/2005 |
| JP | 2007-086269 A | 4/2007 |
| JP | 2008-252508 A | 10/2008 |
| JP | 2009-194498 A | 8/2009 |
| JP | 2009-290635 A | 12/2009 |
| JP | 2010-081535 A | 4/2010 |
| JP | 2010-086379 A | 4/2010 |

* cited by examiner

*Primary Examiner* — Lin Ye
*Assistant Examiner* — Mekonnen Dagnew
(74) *Attorney, Agent, or Firm* — Canon U.S.A., Inc. IP Division

(57) ABSTRACT

A controller controls a photographing angle of view based on the face size detected by the face size calculation unit and the face inclination detected by the face inclination detection unit, wherein the controller controls the photographing angle of view so that a size with respect to the photographing angle of view of the subject image recognized by the face recognition unit becomes a predetermined size.

8 Claims, 14 Drawing Sheets

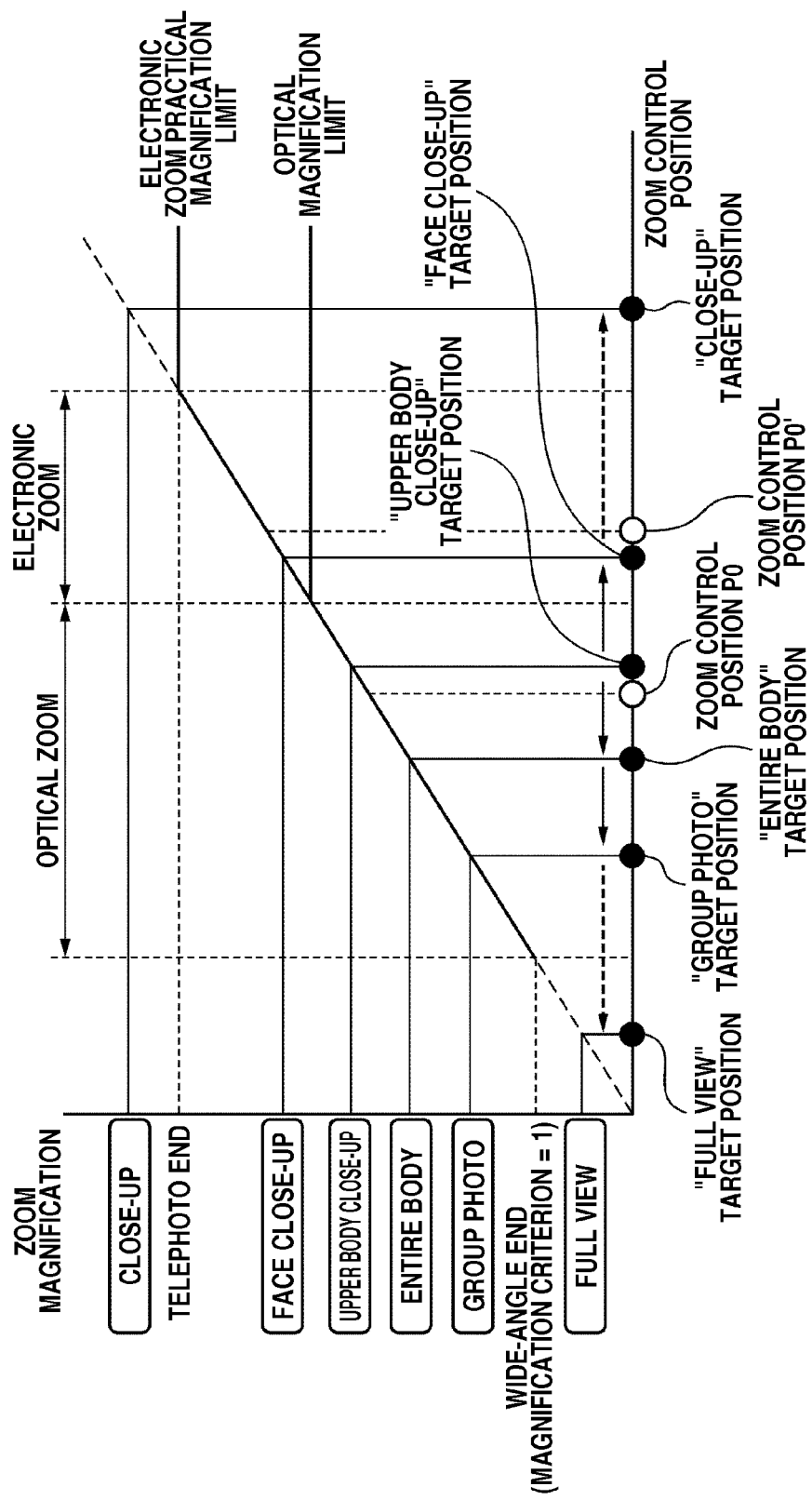

IMAGING APPARATUS FOR PERFORMING AUTOMATIC ZOOM CONTROL IN CONSIDERATION OF FACE INCLINATION OF A SUBJECT IMAGE

BACKGROUND OF THE INVENTION

1. Field of the Invention

The present invention relates to an imaging apparatus capable of performing automatic zoom control.

2. Description of the Related Art

In recent years, a subject recognition technique and a face recognition technique have been mounted on imaging apparatuses such as digital cameras. Such imaging apparatuses perform control such as focusing point movement, release control, and image quality parameter change according to results of subject and face recognitions.

As described below, automatic zoom control based on the subject recognition technique is known.

A conventionally known television camera apparatus reduces camera operator's burden by calculating an on-screen position and a size of a recognized subject image and automatically controlling a camera position and a zoom distance following subject's motion to achieve a preset photographing composition.

Japanese Patent Application Laid-Open No. 2007-86269 discusses a camera apparatus including a distance measurement unit for measuring a distance to a subject, a storage unit for storing a table in which of object size data is set in advance, and a photographing composition selection unit for selecting a plurality of photographing compositions. The camera apparatus performs zoom control according to the object size and the photographing composition to automatically capture an image of the subject with a suitable size.

Although the above-described automatic zoom control function is intended for automatic zooming so that a subject image becomes a predetermined size, the inclination of the subject is not taken into consideration. Therefore, the automatic zoom control function cannot suitably perform zoom control according to a subject-based photographing composition with which a predetermined range of the subject image fits into the angle of view, such as upper body close-up and entire body images. The photographing angle of view generally has unequal vertical and horizontal lengths. Therefore, even if zoom control for equalizing the face size is performed, the photographing composition of a captured image differs according to whether the subject is inclined or not.

SUMMARY OF THE INVENTION

The present invention relates to an imaging apparatus capable of performing suitable automatic zoom control in consideration of face inclination of a subject image.

According to an aspect of the present invention, an imaging apparatus includes a sensor configured to capture a subject image and output an image signal, a face recognition unit configured to recognize a face of the subject image based on the image signal output from the sensor, a face size calculation unit configured to calculate a face size of the face of the subject image recognized by the face recognition unit, a face inclination detection unit configured to detect an inclination of the face of the subject image recognized by the face recognition unit, and a controller configured to control a photographing angle of view based on the face size detected by the face size calculation unit and the face inclination detected by the face inclination detection unit, wherein the controller controls the photographing angle of view so that a size with respect to the photographing angle of view of the subject image recognized by the face recognition unit becomes a predetermined size.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a zoom control diagram illustrating a state where target magnification options are selected.

DESCRIPTION OF THE EMBODIMENTS

Various exemplary embodiments, features, and aspects of the invention will be described in detail below with reference to the drawings.

A digital camera 201 as an imaging apparatus according to a first exemplary embodiment of the present invention will be described below with reference to FIGS. 1 to 11.

A configuration of the digital camera 201 according to the first exemplary embodiment will be described below with reference to FIGS. 1A, 1B, and 2.

Figure 1A:
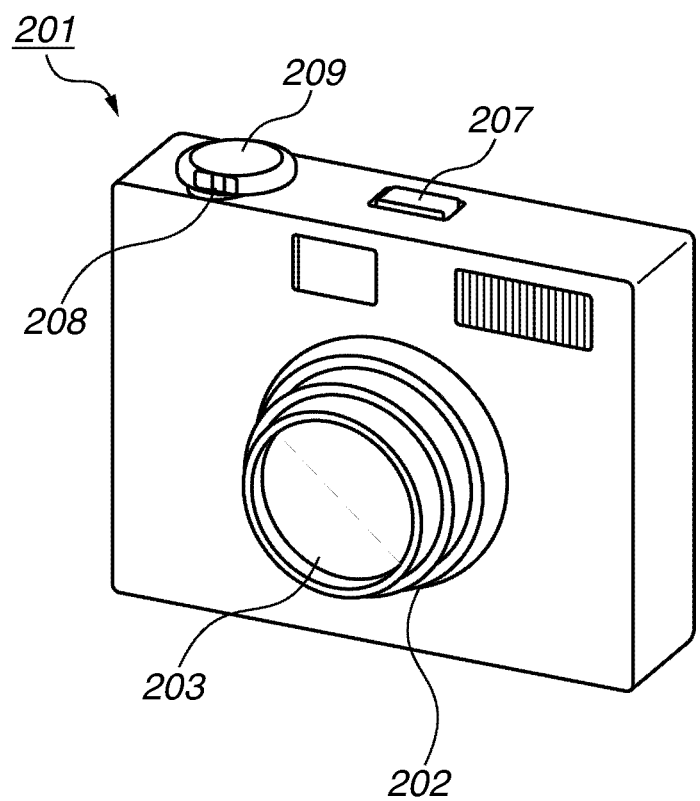
FIGS. 1A and 1B are external views illustrating a digital camera according to a first exemplary embodiment of the present invention.
Figure 1B:
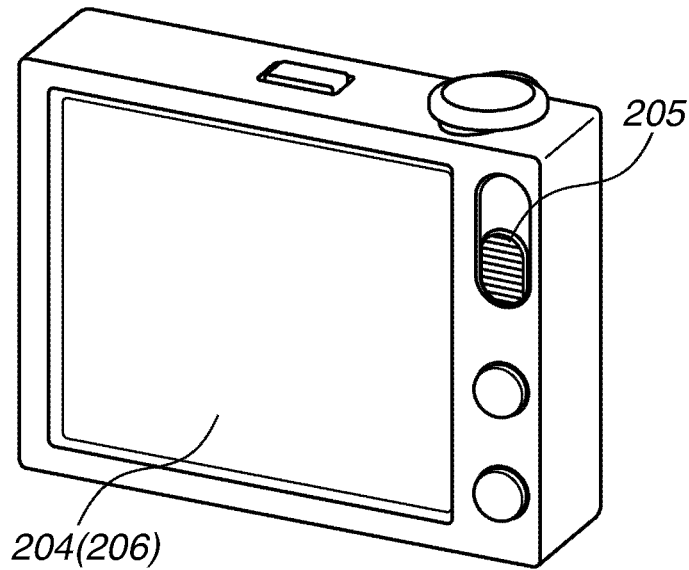

FIGS. 1A and 1B illustrate an appearance of the digital camera 201. FIG. 1A is a bird's-eye view illustrating the front face of the digital camera 201. FIG. 1B is a bird's-eye view illustrating the rear face of the digital camera 201. FIG. 2 is a block diagram illustrating the configuration of the digital camera 201.

The digital camera 201 includes a rectangular parallelepiped housing. A lens barrel unit 202 extends from a surface (hereinafter referred to as front face) of the digital camera 201. The lens barrel unit 202 includes a plurality of cylindrical members which are interlockingly extended and contracted by a cam mechanism (not illustrated) driven by a motor 301. The lens barrel unit 202 includes a plurality of lenses. The lens barrel unit 202, by its extension and contraction, configures an optical zoom mechanism capable of moving a part of a lens group forming an imaging optical system to freely change the focal length. In non-shooting modes, the lens barrel unit 202 is contracted and retracted into the housing, and covered by a barrier member (not illustrated) provided protrudably and retractably, thus protecting a lens surface 203 and improving the portability. Such configuration of the lens barrel unit 202 is well known as retractable lens.

In many cases, the front face of the digital camera 201 is provided with optical auxiliary devices such as a flash firing unit and an auto focus (AF) auxiliary light firing unit.

The rear face of the digital camera 201, i.e., the opposite side of the lens arrangement side, is provided with a liquid crystal display (LCD) monitor 204 as a display unit for monitoring an image and a mode selector switch 205 for selecting an operation mode of the digital camera 201. Further, a touch-panel apparatus 206 is arranged by overlaying onto the LCD monitor 204.

The top face of the digital camera 201 is provided with a power switch 207 for tuning the power ON and OFF, a zoom lever 208 for driving a zoom mechanism to operate the photographing angle of view, and a release switch 209 for instructing image capturing.

Figure 2:
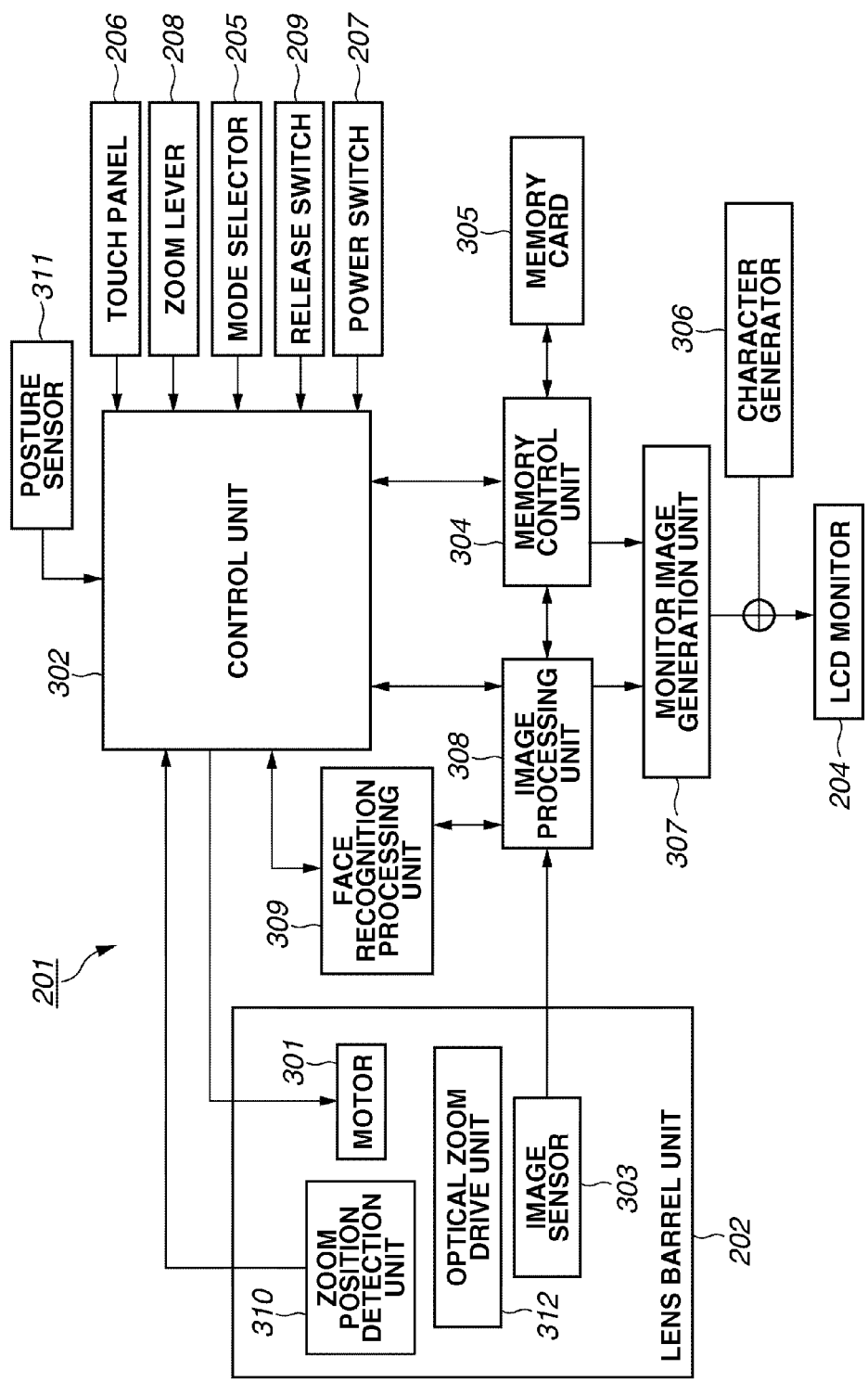
FIG. 2 is a block diagram illustrating a configuration of the digital camera according to the first exemplary embodiment.

As illustrated in FIG. 2, signals generated by operating the above-described operation members of the digital camera 201 are input to a control unit 302. The control unit 302 drives and controls each unit of the digital camera 201 according to an input signal.

For example, when a user operates the power switch 207, a predetermined signal is input to the control unit 302 and then the control unit 302 is activated. The control unit 302 detects the state of the mode selector switch 205 and then controls each unit according to a set operation mode such as a shooting mode or a playback mode.

When the mode selector switch 205 is set to the shooting mode, the control unit 302, in response to the power ON operation, drives and controls the motor 301 to extend the lens barrel unit 202. The control unit 302 also activates an imaging unit (image capturing unit) including an image sensor 303 to enter a shooting standby state. An optical zoom drive unit 312 transmits the driving force of the motor 301 to move a predetermined lens in the imaging optical axis direction. A lead screw mechanism and a cam mechanism for interlockingly move a plurality of lenses in an intricate way are known as the optical zoom drive unit 312.

When a zoom position detection unit 310 detects an amount of drive of the optical zoom drive unit 312, or a position of the predetermined lens moved by the optical zoom drive unit 312, the control unit 302 recognizes the current zoom control position.

The control unit 302 displays a subject image captured by the imaging unit on the LCD monitor 204 as a monitor image.

The control unit 302 detects a recording state of a memory card 305 (recording medium) via a memory control unit 304, and superimposes camera information, which is a character generated by a character generator 306, onto the monitor image generated by a monitor image generation unit 307. The camera information includes the remaining number of photographing calculated from the remaining memory capacity and the current shooting mode (resolution and compression rate), and the remaining operating time calculated from the remaining capacity of a battery (not illustrated) as a power supply.

In response to the operation of the release switch 209, the image processing unit 308 converts the image captured by the imaging unit to a predetermined format, and relevant image data is recorded in the memory card 305 via the memory control unit 304.

When the mode selector switch 205 is set to the playback mode, the lens barrel unit 202 is retracted. The control unit 302 accesses the memory control unit 304 to read the recorded image data from the memory card 305 as a recording medium. The monitor image generation unit 307 rasterizes the read image data to a predetermined format and then displays the relevant image on the LCD monitor 204. Then, in response to a user's operation, the control unit 302 sequentially reads the recorded image data and displays the image on the LCD monitor 204.

The LCD monitor 204 displays operation icons generated by the character generator 306 according to the operation mode of the digital camera 201. The operation icons can be viewed via the touch-panel apparatus 206. Targeting any desired icon displayed on the LCD monitor 204, the user touches a position on the touch-panel apparatus 206 with a finger or the like. The touch-panel apparatus 206 transmits to the control unit 302 an output signal corresponding to the position touched by the user.

Upon reception of the output signal from the touch-panel apparatus 206, the control unit 302 converts the position touched by the user into plane coordinate values on the LCD monitor 204, and performs a function associated with the icon displayed on the coordinate position. A posture sensor 311 detects a posture of the digital camera 201 and then transmits a detection signal to the control unit 302.

In response to the power OFF operation, the control unit 302 instructs the memory control unit 304 to perform termination processing. The memory control unit 304 disconnects the connection with the memory card 305 to prepare for the removal of the memory card 305 by the user. When data is being recorded in the memory card 305, the memory control unit 304 waits for completion of recording, and then disconnects the connection with the memory card 305.

When the lens barrel unit 202 is extended, the control unit 302 retracts it and closes the barrier member interlockingly with the retraction of the lens barrel unit 202.

The control unit 302 turns off the LCD monitor 204 and then cuts off power supply to each unit to complete the power OFF processing.

The digital camera 201 has a function of recognizing a face of a subject person through image processing. This function is generally referred to as the face recognition function.

The digital camera 201 is provided with a matching table having pattern data on human face feature points. The matching table includes shape features of the eyes and mouth, arrangements of the eyes and mouth, and their proportionality relations. A face recognition processing unit 309 refers to the matching table to check whether any feature point of the human face is included in captured image information having undergone, for example, binary processing. Such a function of detecting the human face is applicable to various types of apparatus control as described in the description of the related art. The present exemplary embodiment utilizes this function for zoom drive control (including not only optical zoom control but also electronic zoom control) described below.

Figure 3:
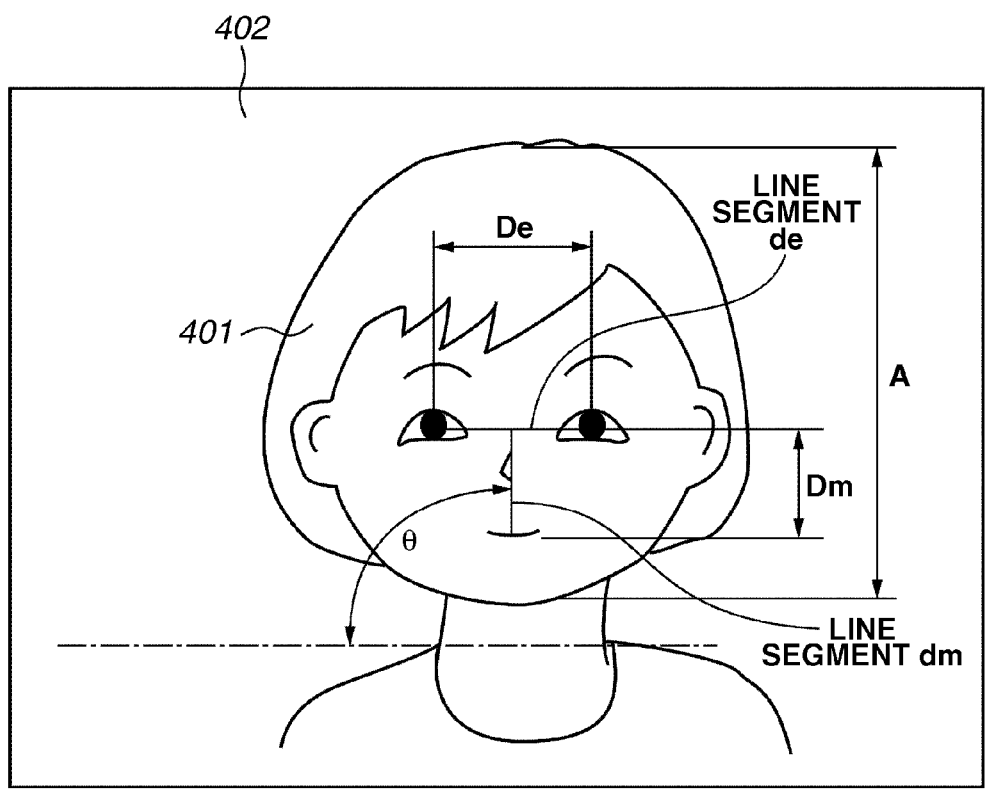
FIG. 3 schematically illustrates a method of face recognition.

FIG. 3 schematically illustrates parameters to be calculated based on a result of face recognition.

When the face recognition processing unit 309 detects a face 401 in a captured image 402, it calculates a line segment length De and a line segment length Dm in the face 401. A line segment de connects the centers of the eyes, and has the line segment length De. A line segment dm perpendicularly intersects with the line segment de and passes through the mouth, and has the line segment length Dm. Based on the value of the line segment length Dm, the control unit 302 estimates a face size A of the subject person with reference to a face size table including face size data.

Preparing a plurality of the matching tables corresponding to age groups, sex, and so on, enables estimating the age group and sex of the subject person. Further, the face size A may be corrected by using an estimation result of the age group and sex. Of course, a combination of the line segment lengths Dm and De may be used for the estimation processing.

The face recognition processing unit 309 further calculates a face inclination $\theta$ formed by the line segment dm with respect to the horizontal line of the screen.

As described above, the digital camera 201 can recognize the face size A and the face inclination $\theta$ of the face 401 of the subject person in the captured image.

Although, in the present exemplary embodiment, the eyes and mouth are used as the feature points for recognizing a face, the nose, ears, eyebrows, and profile of the face can also be used as human face feature points as publicly known. It is also publicly known that the feature points of the face of a specific subject person are registered aiming at improving the recognition accuracy. These feature points are applicable to a method of face recognition described in the present exemplary embodiment.

Zoom control of the digital camera 201 will be described below.

Figure 4:
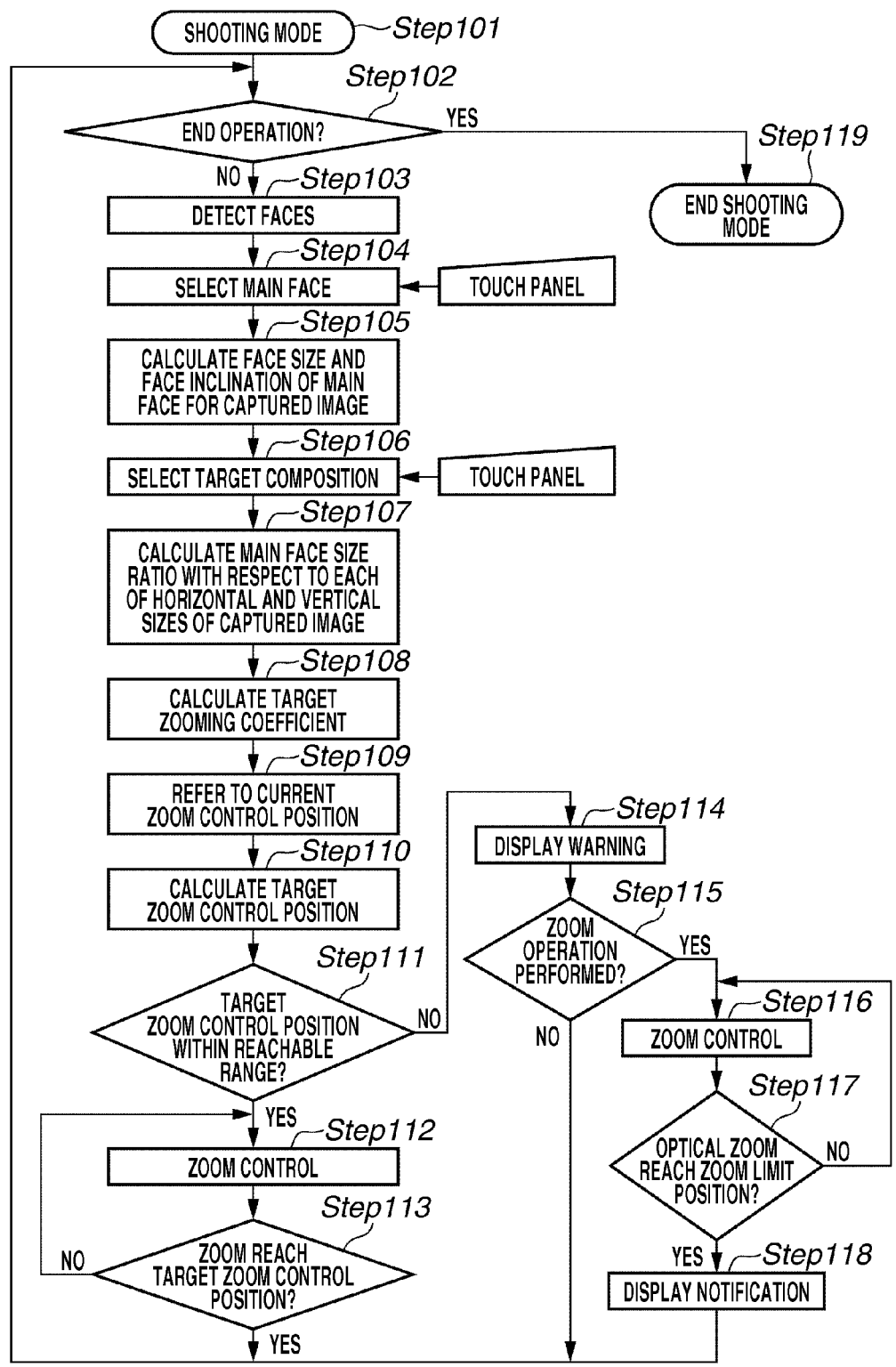
FIG. 4 is a flow chart illustrating operations of the digital camera according to the first exemplary embodiment.

FIG. 4 is a flow chart illustrating operations of the digital camera 201 according to the first exemplary embodiment.

Figure 5A:
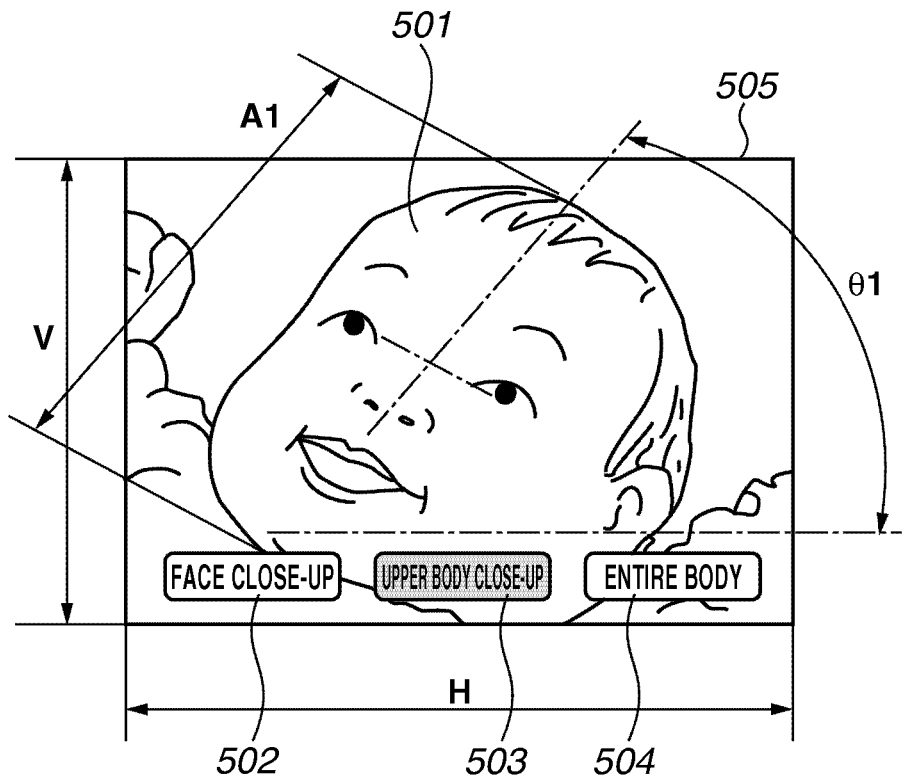
FIGS. 5A and 5B illustrate states in zoom control where a main face is inclined with respect to a photographing screen.
Figure 5B:
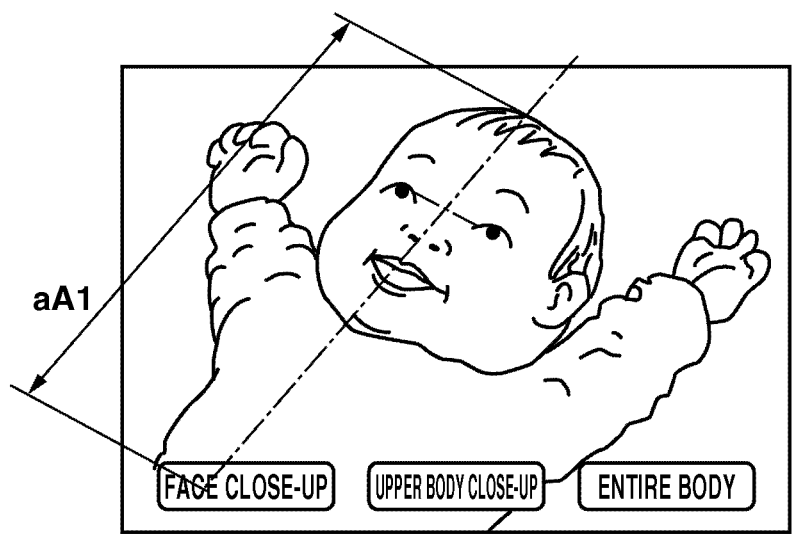
Figure 6:
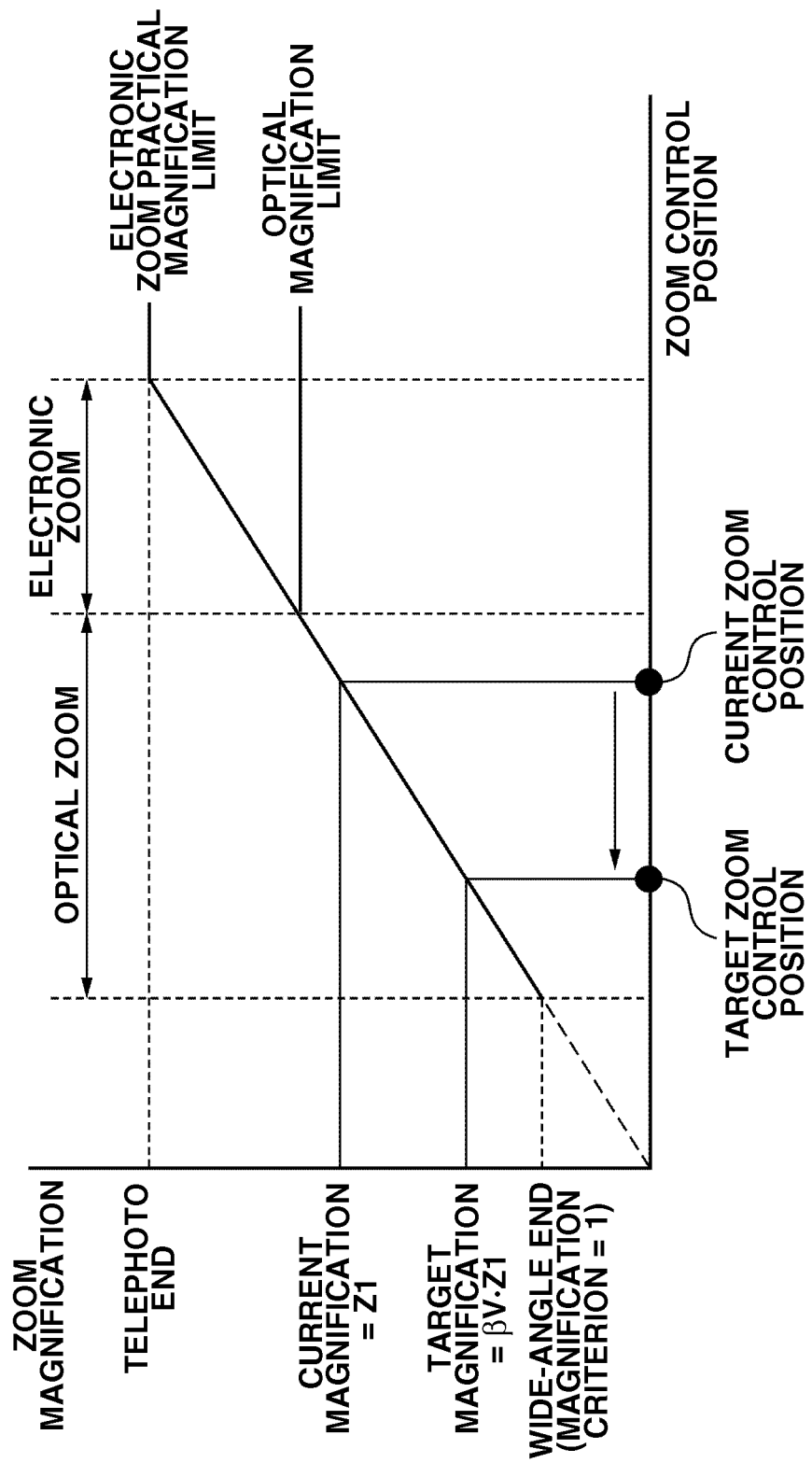
FIG. 6 is a zoom control diagram illustrating a relation between a zoom control position and a zoom magnification.

FIGS. 5A, 5B, 7A, 7B, 8A, and 8B illustrate changes in a photographing angle of view by zoom control, i.e., changes in a state of the captured image. FIG. 6 illustrates a relation between the zoom control position and the zoom magnification. Hereinafter, this diagram is referred to as a zoom control diagram.

By using the face size A and the face inclination $\theta$, the digital camera 201 performs automatic zoom control so that the size of the subject person image in the captured image fits a reference composition having a predetermined size according to the user's operation. The reference composition having the predetermined size refers to a predetermined composition such as "FACE CLOSE-UP", "UPPER BODY CLOSE-UP", and "ENTIRE BODY" as icons illustrated in FIGS. 5A and 5B. Of course, the predetermined size is not limited thereto.

Although, in the present exemplary embodiment, a magnification target value is automatically calculated (generated) to provide reference composition options as default values, a method for determining the magnification target value is not limited thereto. The user may input the magnification target value as long as it is determined based on the proportion of the subject image. For example, the magnification target value may be input as a ratio of the face with respect to the current composition.

Zoom control operations will be described below with reference to FIG. 4.

When the digital camera is in the shooting mode (Step 101), in Step 102, the control unit 302 determines whether the user performs a shooting mode end operation. When the user does not perform the shooting mode end operation (NO in Step 102), the processing proceeds to Step 103. When the user performs the shooting mode end operation (YES in Step 102), the processing proceeds to Step 119 to end the shooting mode.

In Step 103, the face recognition processing unit 309 detects human faces in the photographing screen. If a plurality of faces is detected, the processing proceeds to Step 104. In Step 104, the user touches the touch-panel apparatus 205 to select a main face.

In Step 105, as described above, the control unit 302 calculates the face size A and the face inclination $\theta$. Referring to FIG. 5A, the control unit 302 calculates a face size A1 and detects face inclination $\theta 1$.

The LCD monitor 204 displays operation icons for performing zoom control on the subject image targeting any one of a plurality of reference compositions. More specifically, the LCD monitor 204 displays a "FACE CLOSE-UP" icon 502, an "UPPER BODY CLOSE-UP" icon 503, and an "ENTIRE BODY" icon 504. In Step 106, when the user touches the touch-panel apparatus 206 to select anyone of the reference compositions, the control unit 302 performs zoom control for magnifying a subject image 501 using the selected photographing composition as a target reference composition. A reference composition targeted in the zoom control is referred to as a target reference composition.

Suppose that the user selects the "UPPER BODY CLOSE-UP" icon 503. When the user operates the icon, an icon display color is inverted to indicate that the operation has been accepted.

When the user selects the target reference composition, the control unit 302 calculates from the face size A1 a subject image size which fits into the photographing screen. The subject image size is defined by a ratio to the calculated face size A1. More specifically, the subject image size can be obtained by multiplying the face size A1 by a predetermined coefficient. Hereinafter, this coefficient is referred to as a photographing composition coefficient $\alpha$.

For example, in the case of the "UPPER BODY CLOSE-UP" composition, the control unit 302 performs zoom control so that the upper body close-up size (a×A1) fits into the photographing screen assuming the photographing composition coefficient $\alpha=a$. Likewise, when the target reference composition is "ENTIRE BODY" and the photographing composition coefficient $\alpha=b$ is assumed, the entire body image size becomes (b×A1). In the case of the "FACE CLOSE-UP" composition, the photographing composition coefficient $\alpha=1$ is assumed. More specifically, a=2.5 and b=7 are assumed, for example.

The photographing composition coefficient may be statistically obtained from the size ratio of the human body to the face or individually input according to a body shape of a specific subject person. Further, when the subject image 501 is a small child as illustrated in FIG. 5, a separate photographing composition coefficient table may be used since a body shape of a small child is largely different from that of an adult. As described above, it is possible to presume that the subject is a small child from feature points of the face.

In Step 107, when the face inclination $\theta 1$ is a mean value from 0 to 90 degrees, i.e., the face of the subject image 501 is neither horizontal nor perpendicular to the photographing screen 505 (referring to FIGS. 5A and 5B), the control unit 302 obtains face size ratios R to the horizontal size and the vertical size of the photographing screen 505 respectively.

The face size ratios R to a vertical size V and a horizontal size H of the photographing screen 505 can be calculated as follows:

Screen vertical direction ratio $RV=(A1 \cdot \sin \theta 1)/V$

Screen horizontal direction ratio $RH=(A1 \cdot \cos \theta 1)/H$

In Step 108, the control unit 302 obtains a coefficient β for obtaining a target zoom magnification so that the coefficient β satisfies the following formulas. The coefficient β is referred to as a target magnification coefficient. The target magnification coefficient β is preferably obtained only for a larger direction, more specifically, by using one of the following two formulas according to a magnitude relation between the screen vertical direction ratio RV and the screen horizontal direction ratio RH.

When $RV>RH$: $\beta V \cdot (\alpha \cdot A1 \cdot \sin \theta 1)/V = X$

When $RV<RH$: $\beta H \cdot (\alpha \cdot A1 \cdot \cos \theta 1)/H = X$ wherein X is a constant which defines an intended ratio of the subject size to the vertical or horizontal size of the photographing screen after zoom control. When X=1, the subject image size after zoom control coincides with the vertical or horizontal size of the photographing screen. When X=0.9, the subject image size is adjusted with a margin which is 10% of the screen. The value of the constant X may be arbitrarily defined in consideration of the appearance of the image.

In Step 109, the control unit 302 refers to the current zoom control position based on an output from the zoom position detection unit 310 and communication with the image processing unit 308.

FIG. 6 illustrates a relation between the zoom control position and the zoom magnification of the digital camera 201 (hereinafter this diagram is referred to as zoom control diagram). In the zoom control diagram, the zoom control position is assigned to the horizontal axis and the zoom magnification is assigned to the vertical axis in which the image magnification at the wide-angle end is set to 1.

The zoom mechanism of the digital camera 201 includes the optical zoom mechanism based on the movement of the above-described lens group and an electronic zoom mechanism based on electronic trimming processing (i.e., electronic zoom) by the image processing unit 308. In electronic trimming processing, the image processing unit 308 electronically magnifies a predetermined range cut out from a captured image. Limits on the wide-angle and telephoto sides of the optical zoom mechanism are determined by structural limit points. The electronic zoom is activated when the optical zoom reaches the limit on the telephoto side. With the electronic zoom, since an image formed by pixels is electronically magnified, the resolution of the image decreases with increasing magnification. An electronic zoom limit at which the image quality is practically satisfactory is referred to as a telephoto end of the digital camera 201.

The zoom control position refers to a physical position of a lens in the optical zoom region or a trimming size of an image in the electronic zoom region.

Although, in the present exemplary embodiment, the zoom control diagram gives a linear relation between the zoom control position and the zoom magnification, the relation therebetween is not limited thereto. The zoom control diagram may give a curve, i.e., a nonlinear relation therebetween, according to the configuration of the optical zoom mechanism. However, the zoom control diagram generally defines the relation between the zoom control position and the zoom magnification by one-to-one correspondence.

When the control unit 302 refers to the current zoom control position in Step 109, the control unit 302 recognizes a current zoom magnification Z1 from the zoom control diagram. Referring to FIG. 5A, since the face size ratio of the subject image 501 is larger in the screen vertical direction (RV>RH), the target magnification coefficient βV can be determined by the above-described formula. The control unit 302 multiplies the current zoom magnification Z1 by the target magnification coefficient βV to determine a target magnification βV·Z1 for fitting the subject image 501 into the "UPPER BODY CLOSE-UP" composition.

In Step 110, the control unit 302 calculates a target zoom control position from the zoom control diagram. Thus, the control unit 302 obtains a target zoom magnification for fitting the subject image 501 in FIG. 5A into the "UPPER BODY CLOSE-UP" composition and the target zoom control position therefor. The control unit 302 assumes the target zoom magnification or the target zoom control position as a magnification target value. In other words, the control unit 302 generates the magnification target value in Step 110.

In Step 111, when the target zoom control position is within a reachable range, i.e., the target zoom control position is within a range between the wide-angle end and the telephoto end (YES in Step 111), the processing proceeds to Step 112. In Step 112, the control unit 302 drives the motor 301 to move the position of a predetermined lens to perform optical zoom control.

In Step 113, when the zoom position detection unit 310 detects that optical zoom has reached the target zoom control position (YES in Step 113), the control unit 302 stops driving the motor 301 to end the zoom operation.

Depending on the case, the target zoom control position may exist in the electronic zoom region. In this case, after the optical zoom reaches the telephoto end, the control unit 302 communicates with the image processing unit 308 to perform the electronic zoom. In the electronic zoom region, the control unit 302 uses an image cut-out size as zoom control position information.

Thus, by using the face size A1 and the face inclination η1 in the photographing screen 505, the control unit 302 automatically adjusts the zoom magnification so as to be suitable for the upper body close-up composition. After moving the camera as required to correct the subject position in the photographing screen 505, the user can capture an image of the upper body close-up composition as illustrated in FIG. 5B.

As another example, states in zoom control illustrated in FIGS. 7A and 7B will be described below.

Figure 7A:
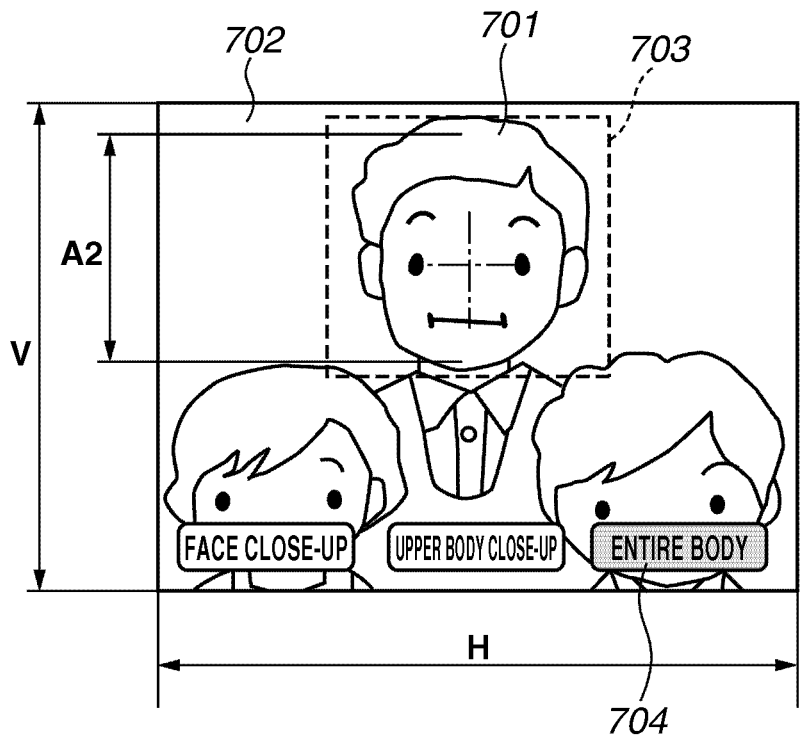
FIGS. 7A and 7B illustrate states in zoom control where a main face is upstanding with respect to a photographing screen.
Figure 7B:
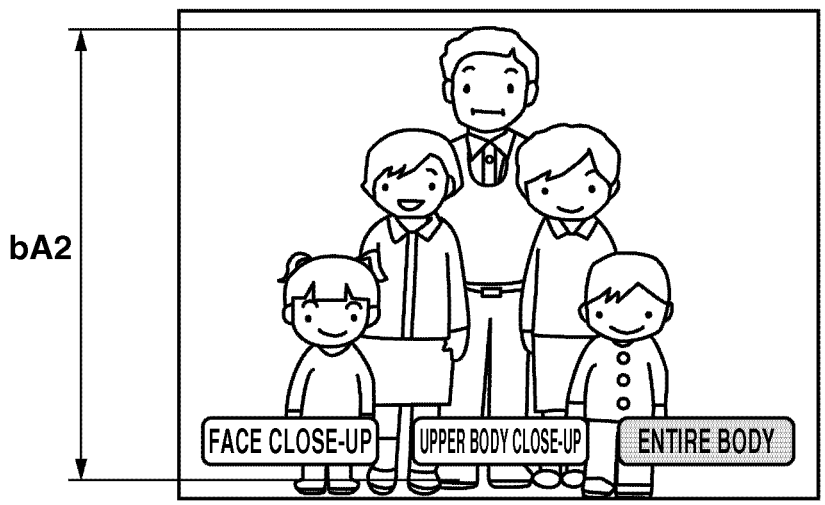

Referring to FIGS. 7A and 7B, a photographing screen 702 includes a plurality of subject persons. When a plurality of faces is detected in Step 103, the processing proceeds to Step 104. In Step 104, the control unit 302 selects a subject face which is watched by the user as a main face. When the user selects a main face 701, the control unit 302 superimposes onto the main face 701 a selection frame 703 (FIG. 7A) generated by the character generator 306.

To select a main face, the user may directly touch it on the touch-panel apparatus 206. Alternatively, the user may move the selection frame 703 from face to face by operating a shift button (not illustrated) and, when a desired face is selected, operate a determination button (not illustrated) to determine the main face.

Since the main face 701 is perpendicular to the horizontal line of the screen, i.e., the face inclination θ=90 degrees, the control unit 302 evaluates only the screen vertical direction ratio RV, calculates the target magnification coefficient βV, and performs zoom control. For example, when the user specifies the main face 701 and selects an "ENTIRE BODY" composition 704, an entire body image in FIG. 7B is obtained.

States in zoom control in FIGS. 8A and 8B will be described below.

Figure 8A:
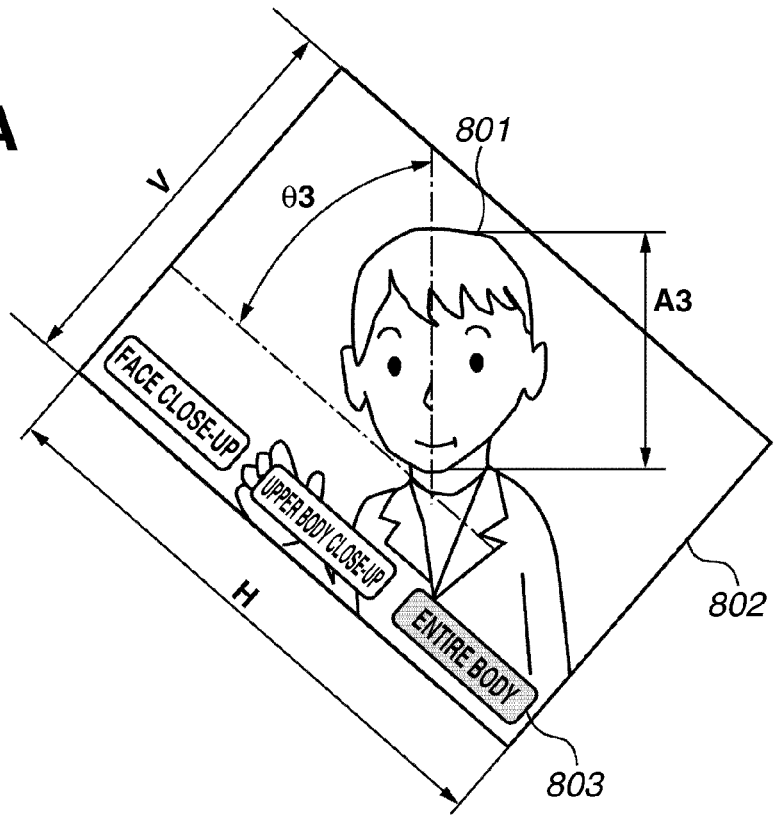
FIGS. 8A and 8B illustrate states in zoom control where the camera is inclined.
Figure 8B:
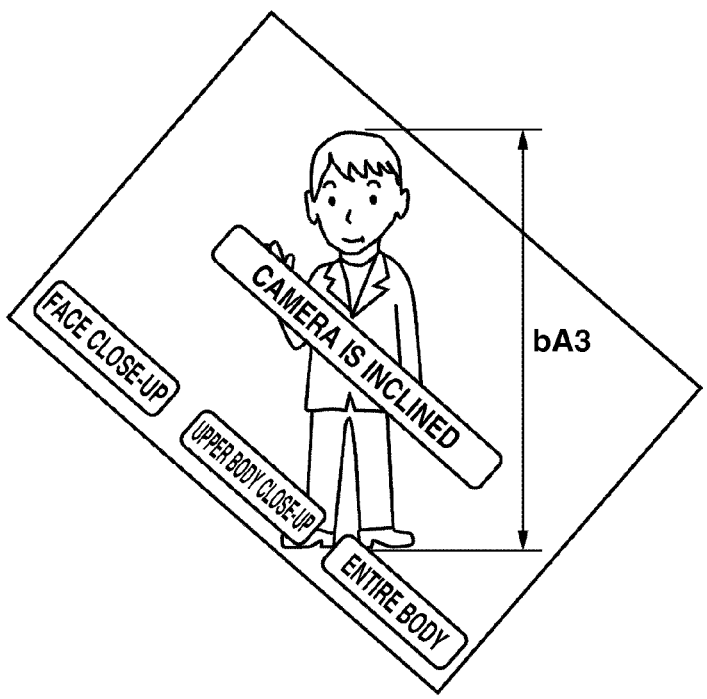

Referring to FIGS. 8A and 8B, the digital camera 201 itself is inclined with respect to a subject 801. In the present exemplary embodiment, the face inclination θ3 is calculated with respect to the horizontal direction of the photographing screen 802. Therefore, when the user selects an "ENTIRE BODY" composition 803 in FIG. 8A, an entire body image is obtained as illustrated in FIG. 8B. In this case, based on an output of the posture sensor 311, a caution about the posture inclination of the digital camera 201 may be displayed as illustrated in FIG. 8B. Further, after caution display, the face size ratio R may be evaluated after monitoring the output of the posture sensor 311 and then detecting that the posture of the digital camera 201 has been corrected to the horizontal or vertical state.

An operation to be performed when the target zoom control position is out of the reachable range in Step 111 will be described below.

As described above, a variable magnification range is determined by the configuration of the zoom mechanism. The wide-angle end is set to the zoom magnification ratio 1, and the telephoto end is set to, for example, the zoom magnification ratio 12. In other words, a target magnification βZ, which is a product of a current magnification Z and the target magnification coefficient β, ranges from ratio 1 to ratio 12.

Figure 9:
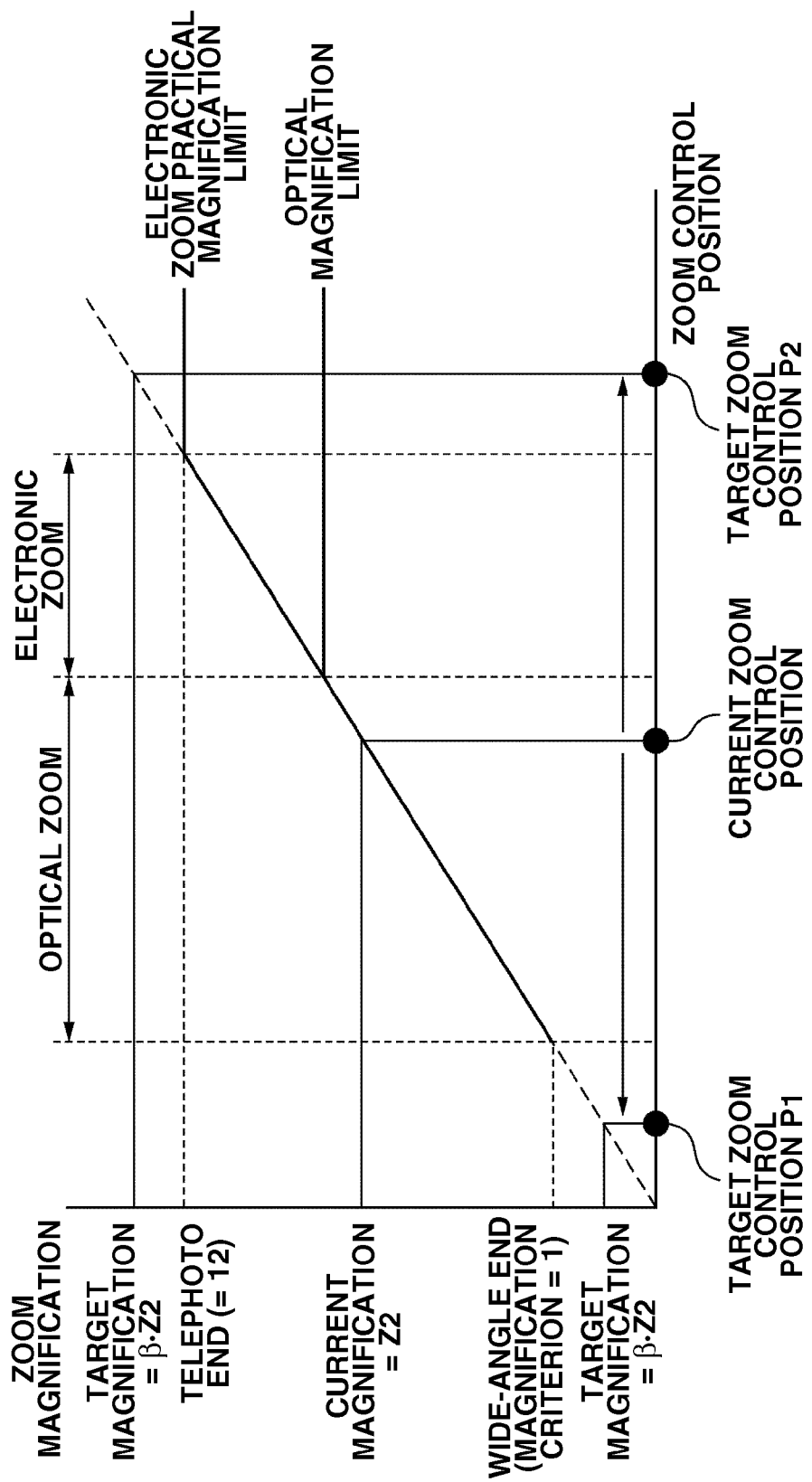
FIG. 9 is a zoom control diagram illustrating a state where a target magnification exceeds a zoom magnification limit.

As illustrated in FIG. 9, when a target magnification βZ2 is smaller than 1, a target zoom control position P1 is on the left-hand side of the wide-angle end by the optical zoom. Likewise, when a target magnification ⊕Z2 is larger than 12, a target zoom control position P2 is on the right-hand side of an electronic zoom practical magnification limit position. By evaluating the target magnification βZ in this way, in Step 111, the control unit 302 can determine whether the magnification can be changed to the target reference composition selected by the user, i.e., whether the target zoom control position is within the reachable range.

Figure 10A:
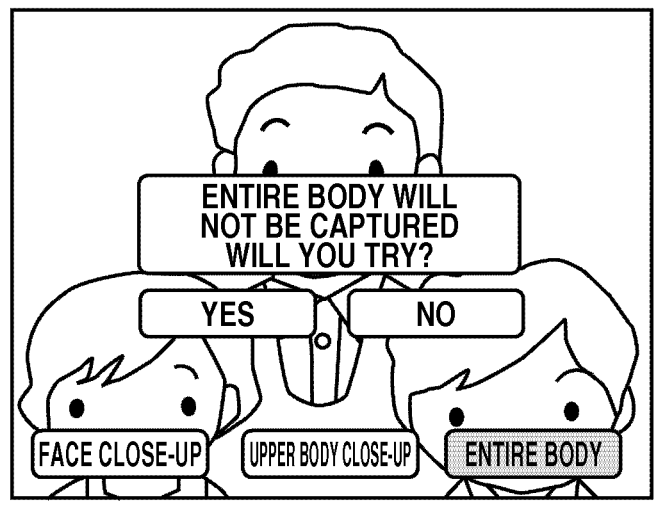
FIGS. 10A and 10B illustrate examples of guidance display when the target magnification exceeds the zoom magnification limit.

When the control unit 302 determines that the target zoom control position is out of the reachable range (NO in Step 111), the processing proceeds to Step 114. In Step 114, the control unit 302 displays a warning as illustrated in FIG. 10A. As illustrated in FIG. 10A, the control unit 302 may perform an operation for confirming user's intention.

In Step 115, when the user touches "YES" to perform the zoom operation (magnification operation) (YES in Step 115), the processing proceeds to Step 116. Since the target zoom control position is out of the reachable range, In Step 116, the control unit 302 performs zoom control, and in Step 117, the control unit 302 determines whether the optical zoom reaches a zoom limit position (magnification limit position). When it is determined that the optical zoom reaches the zoom limit position (YES in Step 117) and the control unit 302 stops the magnification operation. Then, in Step 118, the control unit 302 displays a notification that the optical zoom reaches the zoom limit position.

Figure 10B:
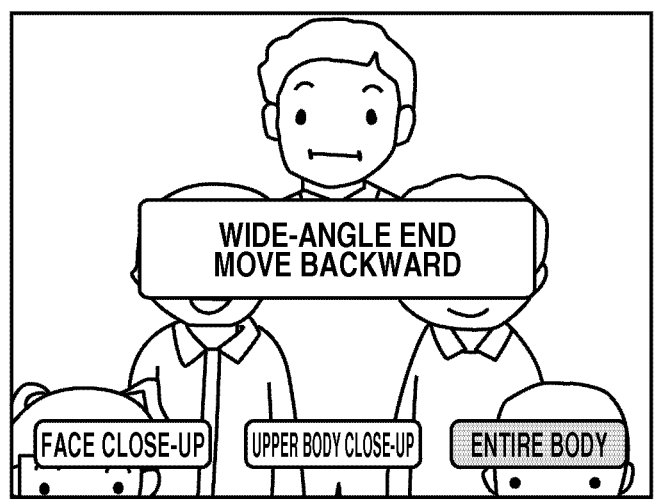
Figure 11A:
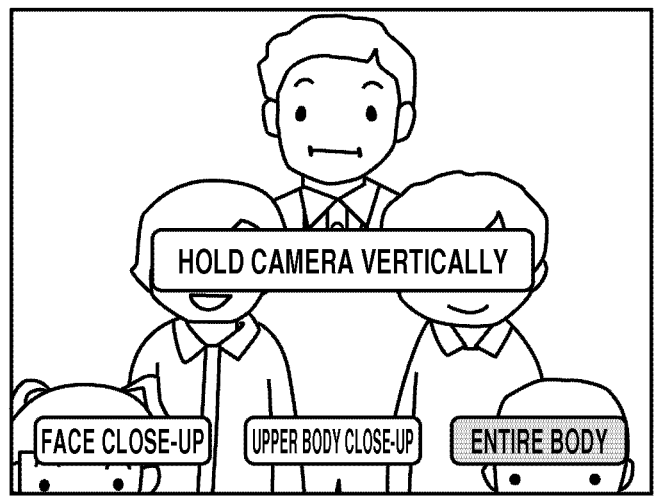
FIGS. 11A and 11B illustrate other examples of the guidance display.

For example, when the optical zoom is performed toward the target zoom control position P1 in FIG. 9, the zoom control stops at the wide-angle end. Therefore, as illustrated in FIG. 10B, the control unit 302 may display a guidance message for prompting the user to move away from the subject. Alternatively, as illustrated in FIG. 11A, the control unit 302 may displays a guidance message for prompting the user to change the orientation of the digital camera 201 from horizontal to vertical position. Evaluation by interchanging the face size ratios R to the horizontal and vertical sizes of the photographing screen enables determining in advance whether the target reference composition can be achieved after the user changes the orientation of the digital camera 201.

Figure 11B:
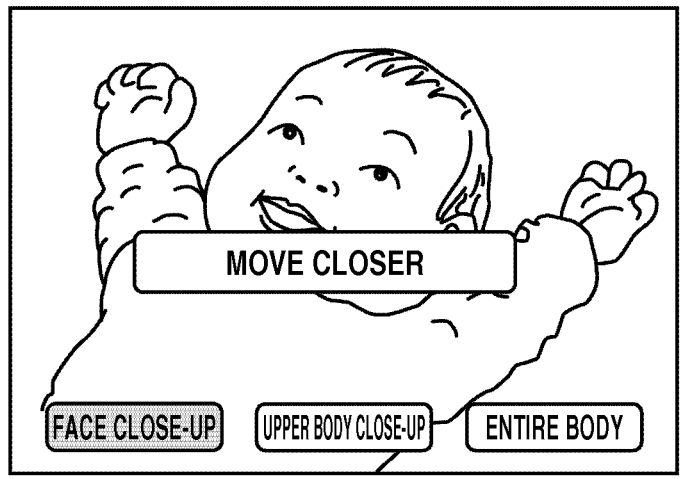

When the optical zoom is performed toward the target zoom control position P2 in FIG. 9, the zoom control stops at the telephoto end. Therefore, as illustrated in FIG. 11B, the control unit 302 may display a guidance message for prompting the user to move closer to the subject.

A second exemplary embodiment of the present invention will be described below with reference to FIGS. 12 to 14.

In the second exemplary embodiment, the configuration of the digital camera 201 is assumed to be identical to that in the first exemplary embodiment, and duplicated explanations will be omitted. In the following explanations, FIGS. 1 and 2 will be diverted, and components identical to those in the first exemplary embodiment are assigned the same reference numerals.

Figure 12:
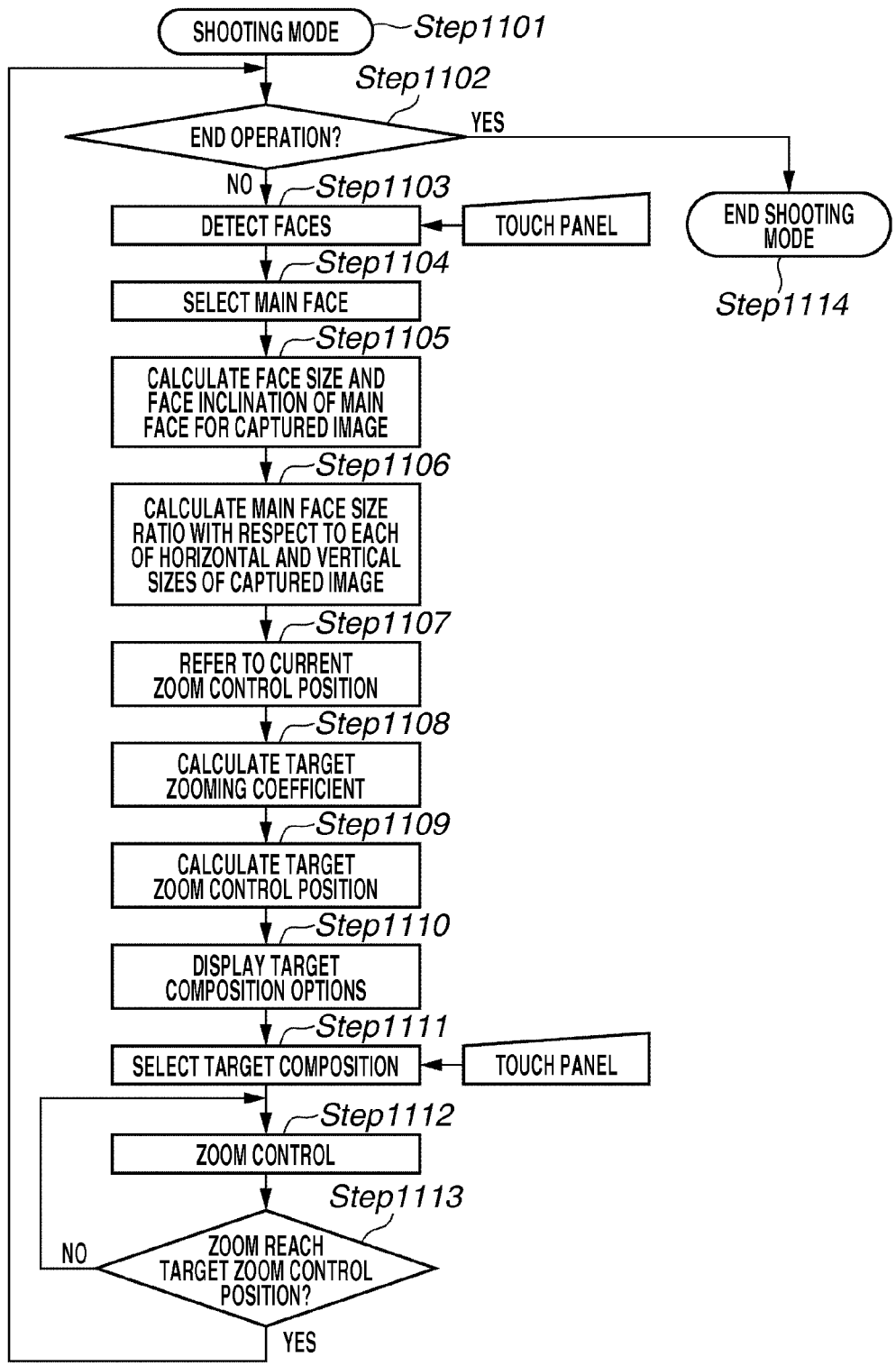
FIG. 12 is a flow chart illustrating operations of a digital camera according to a second exemplary embodiment.

FIG. 12 is a flow chart illustrating zoom control operations in the second exemplary embodiment.

In Step 1103, the control unit 302 detects faces in a captured image. When a plurality of faces is detected in Step 1103, then in Step 1104, the control unit 302 selects a main face via a user's operation. In Step 1105, when the main face is selected, the control unit 302 calculates a face size A and a face inclination θ in a similar way to the first exemplary embodiment.

In Step 1106, the control unit 302 obtains face size ratios R to the horizontal and vertical sizes of the photographing screen respectively.

In Step 1107, the control unit 302 refers to the current zoom control position.

The digital camera 201 can be provided with predetermined target reference composition options, that is "CLOSE-UP", "FACE CLOSE-UP", "UPPER BODY CLOSE-UP", "ENTIRE BODY", "GROUP PHOTO", and "FULL VIEW" as illustrated in FIG. 13. A photographing composition coefficient α is predefined for each reference composition.

For example, the "CLOSE-UP" composition assumes the photographing composition coefficient α=0.5 and a case where a part of the face is magnified. Assuming each photographing situation, a suitable value may preferably be set based on a relation between the face size and the photographing composition, for example, α=20 is set for the "GROUP PHOTO" composition and α=50 is set for the "FULL VIEW" composition. Of course, photographing composition options are not limited thereto.

The control unit 302 acquires the current zoom control position information in Step 1107. In Step 1108, similar to the first exemplary embodiment, the control unit 302 obtains the target magnification coefficient β and the target zoom magnification Z for each target reference composition option.

In Step 1109, after the target zoom magnification Z is obtained for each target reference composition option, the control unit 302 calculates the target zoom control position from the zoom control diagram as illustrated in FIG. 14. In Step 1110, the control unit 302 selects three photographing composition options centering around the current zoom control position, and displays relevant operation icons on the LCD monitor 204.

When picking out the photographing composition options, the control unit 302 refers to the target zoom control positions corresponding to respective photographing composition options. Excluding a photographing composition option corresponding to a target zoom control position closest to the current zoom control position, the control unit 302 selects three composition options from the vicinity of the current zoom control position. Further, a photographing composition which is out of the reachable range of the target zoom control position is excluded from the options.

Figures 13A, 13B:
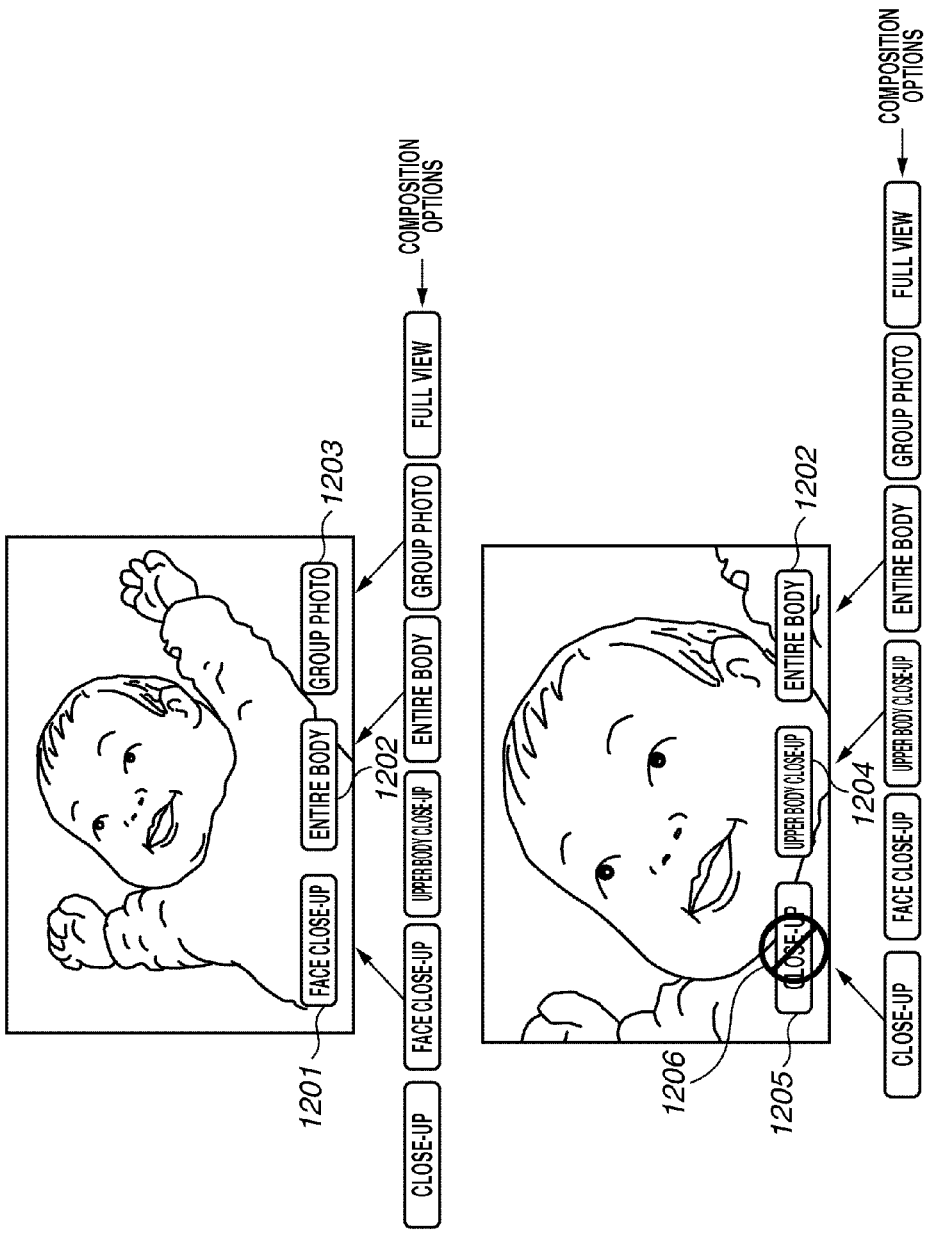
FIGS. 13A and 13B illustrate examples of screen display when target magnification options are changed.

Referring to FIG. 13A, a current zoom control position P0 is in the vicinity of the target zoom control position of the "UPPER BODY CLOSE-UP" composition ("UPPER BODY CLOSE-UP" target position) as illustrated in FIG. 14. Therefore, the control unit 302 selects three composition options excluding the "CLOSE-UP" composition which is not reachable since the telephoto end position is exceeded, i.e., a "FACE CLOSE-UP" composition 1201, an "ENTIRE BODY" composition 1202, and a "GROUP PHOTO" composition 1203.

Referring to FIG. 13B, a current zoom control position P0' is in the vicinity of the target zoom control position of the "FACE CLOSE-UP" composition ("FACE CLOSE-UP" target position) as illustrated in FIG. 14. Since there is no reachable target composition on the telephoto side, the control unit 302 selects two composition options on the wide-angle side of the "FACE CLOSE-UP" composition, i.e., an "UPPER BODY CLOSE-UP" composition 1204 and an "ENTIRE BODY" composition 1202. Then, to indicate that there is no composition option on the telephoto side, the control unit 302 displays a "CLOSE-UP" icon 1205 with an operation disapproval mark (selection disapproval mark) 1206 superimposed thereon.

As described above, the control unit 302 refers to the current zoom control position and changes selectable photographing composition candidates.

In Step 1111, the user touches the touch-panel apparatus 206 to select one of photographing composition options displayed in Step 1110. In Step 1112, the control unit 302 performs zoom control toward the target zoom control position. In Step 1113, the control unit 302 determines whether the optical zoom reaches the target zoom control position. When the optical zoom reaches the target zoom control position (YES in Step 1113), the control unit 302 ends the zoom control.

The second exemplary embodiment differs from the first exemplary embodiment in the use of the current zoom control position as a parameter. The effect is that suitable target reference composition options can be selected centering around the current composition and then displayed. More specifically, for example, when the optical zoom is physically at the telephoto end, further magnification is not possible and therefore magnification options on the wide-angle side are selected and displayed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-239489 filed Oct. 26, 2010, which is hereby incorporated by reference herein in its entirety.

What is claimed is:

1. An imaging apparatus comprising:
a sensor configured to capture a subject image and output an image signal;
a subject detection unit configured to detect a subject image based on the image signal output from the sensor;
a subject inclination detection unit configured to detect inclination information related to an inclination of the subject image detected by the subject detection unit, wherein the inclination is an inclination of the subject image for a photographing angle of view; and
a controller configured to control a display apparatus to display a plurality of reference compositions so that one composition can be selected from the reference compositions by a user, wherein the display of a plurality of reference compositions is performed in conjunction with a display of the detected subject image, and wherein the controller is configured to control an angle of view so that a subject size of the subject image detected by the subject detection unit becomes a predetermined size, wherein the control of the angle of view is performed based on the inclination information detected by the subject inclination detection unit.

2. The imaging apparatus according to claim 1, wherein the controller determines the predetermined size, and wherein the determination is executed by selecting one composition from among a plurality of reference compositions.

3. The imaging apparatus according to claim 2, wherein the controller selectably displays the plurality of reference compositions on a display apparatus.

4. The imaging apparatus according to claim 2, wherein the controller selectably displays on a photographing screen reference compositions having a size close to a size of a current composition.

5. The imaging apparatus according to claim 1, wherein, if the controller determines that it is impossible to control the angle of view up to the predetermined size, the controller notifies that fact.

6. The imaging apparatus according to claim 1, wherein the subject detection unit recognizes a face image as the subject image.

7. The imaging apparatus according to claim 1, wherein the display of a plurality of reference compositions overlaps with a display of the subject image.

8. The imaging apparatus according to claim 1, wherein the display of a plurality of reference compositions is performed after detection of the subject image.

* * * * *